US008605698B2

(12) United States Patent
Moeller et al.

(10) Patent No.: US 8,605,698 B2
(45) Date of Patent: *Dec. 10, 2013

(54) VEHICLE WITH MOBILE ROUTER

(75) Inventors: Douglas S Moeller, Santa Rosa, CA (US); Ronald W Pashby, San Francisco, CA (US)

(73) Assignee: Autonet Mobile, Inc, San Francisco, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/373,932

(22) Filed: Dec. 5, 2011

(65) Prior Publication Data

US 2012/0163361 A1    Jun. 28, 2012

Related U.S. Application Data

(63) Continuation-in-part of application No. 12/514,054, filed as application No. PCT/US2007/011631 on May 15, 2007, now Pat. No. 8,072,994.

(60) Provisional application No. 60/800,749, filed on May 16, 2006, provisional application No. 60/800,679, filed on May 16, 2006, provisional application No. 60/800,750, filed on May 16, 2006.

(51) Int. Cl.
*H04W 4/00* (2009.01)

(52) U.S. Cl.
USPC ........... 370/338; 370/328; 370/359; 370/401; 370/419; 455/3.01; 455/11.1; 455/41.2; 455/422.1; 455/445

(58) Field of Classification Search
USPC ......... 370/310, 328, 331, 332, 338, 346, 359, 370/401, 419, 463; 455/3.01, 11.1, 41.2, 455/403, 422.1, 432.1, 435.1, 436, 445, 455/456.1
See application file for complete search history.

(56) References Cited

U.S. PATENT DOCUMENTS

| | | | | |
|---|---|---|---|---|
| 2003/0009271 A1* | 1/2003 | Akiyama | ........................ | 701/33 |
| 2004/0023645 A1* | 2/2004 | Olsen et al. | ................... | 455/418 |
| 2004/0229199 A1* | 11/2004 | Ashley et al. | ................. | 434/323 |
| 2007/0030857 A1* | 2/2007 | Fulknier et al. | ............... | 370/401 |
| 2007/0153802 A1* | 7/2007 | Anke et al. | ............... | 370/395.42 |

* cited by examiner

*Primary Examiner* — Wesley Kim
*Assistant Examiner* — Dinh P Nguyen
(74) *Attorney, Agent, or Firm* — Donald J. Lenkszus

(57) ABSTRACT

A vehicle, comprises a vehicle network bus and a mobile router. The mobile router comprises a local area network interface comprising a first wireless transceiver of a first predetermined type to provide a link to first a local area network and a wide area network interface comprising a second wireless transceiver of a second predetermined type to provide a link to a wide area network. One of the wide area network interface and the local area network interface is selectively operable to establish a wireless communication link with a network management system comprising a communication server. The router further comprises an application executable by the at least one processor to selectively acquire predetermined data from the vehicle network bus. The communication agent is operable to upload the predetermined data to the network management system.

51 Claims, 5 Drawing Sheets

VEHICLE WITH MOBILE ROUTER

CROSS-REFERENCE TO RELATED APPLICATIONS

The present application is a continuation-in-part of U.S. patent application Ser. No. 12/514,054 filed as PCT Application No. PCT/US07/11631 filed on May 15, 2007 and claiming priority to U.S. provisional application Ser. No. 60/800,749, filed May 16, 2006, U.S. provisional application Ser. No. 60/800,679, filed May 16, 2006 and U.S. provisional application Ser. No. 60/800,750, filed May 16, 2006. The present application is related to the following patent applications filed on even date herewith:

FIELD OF THE INVENTION

The present invention relates to a vehicular wireless network mobile router configured for mobile use in a vehicle without constraint as to whether the vehicle is in motion or not.

BACKGROUND

The use of mobile or wireless end-user computer-type devices has increased significantly. Such mobile devices, must be able to connect to a wireless network. Wireless local area networks (LANs) are often deployed inside structures such as homes, offices, public and commercial buildings. A typical wireless LAN comprises one or more wireless access points, such as a wireless router or "hot spot", which communicates wirelessly with the mobile device, and allows the mobile device to connect to a wired network or other network that is also in communication with the access point. To stay connected to such a wireless LAN, the mobile device must usually stay within wireless communication range of the access points. This constrains the effective mobility of a wireless device.

The mobility constraining problem is particularly aggravated when the mobile device is disposed within a vehicle that is in motion. The mobility constraining problem has been addressed somewhat by use of cellular networks that allow mobile devices having cellular network interfaces to communicate wireless data with such cellular networks. However, most mobile computer devices do not have cellular network interfaces.

As the use of mobile devices has expanded, the mobility of such devices has expanded to the use wireless routers in vehicles. Such routers are referred to as "mobile routers" or "mobile nodes". Mobile routers typically permit a mobile device located in a vehicle that is in motion to maintain a connection to a wide area network and thereby greatly expand the mobility of the mobile device. Mobile routers are fully operable whether the vehicle having a mobile router installed therein is in motion or stationary. Connection to the Internet may be maintained by the mobile router as it travels across cellular networks.

SUMMARY

In one embodiment, a vehicle, comprises a vehicle network bus and a mobile router. The mobile router comprises a local area network interface comprising a first wireless transceiver of a first predetermined type to provide a link to first a local area network and a wide area network interface comprising a second wireless transceiver of a second predetermined type to provide a link to a wide area network. The embodiment further comprises at least one processor to control operation of the local area network interface and the wide area network interface. One of the wide area network interface and the local area network interface is selectively operable to establish a wireless communication link with a network management system comprising a communication server. The router further comprises a communication agent; and an application executable by the at least one processor to selectively acquire predetermined data from the vehicle network bus. The communication agent is operable to upload the predetermined data to the network management system.

In the embodiment, the at least one processor is operable to acquire the predetermined data during time periods that the wide area network interface is not communicating with the network management system. The communication agent is operable to upload the predetermined data to the network management system upon occurrence of a predetermined event.

In one embodiment, the predetermined event comprises a predetermined time period.

In one embodiment the predetermined time period is the time that said wide area network interface is in communication with said network management system.

In another embodiment the predetermined event is determined by the predetermined data.

In one embodiment the router comprises a memory, and the predetermined data is stored in said memory.

In various embodiments, the at least one processor provides a time stamp for the predetermined acquired data at the time the predetermined acquired data is acquired. The time stamp is stored in the memory in association with the corresponding predetermined data.

In various embodiments, the at least one processor is operable to assign a priority for said predetermined data; and the at least one processor is operable to execute a predetermined action to take with the predetermined data.

The at least one processor is operable to initiate immediate upload to the network management system of the predetermined data having a predetermined one assigned priority.

The at least one processor is operable to control upload of predetermined data having the predetermined one assigned priority at a first data rate. The at least one processor is operable to control upload of yhr predetermined data having a predetermined second assigned priority at a second predetermined data rate, the second predetermined data rate being slower than said first predetermined data rate.

In one embodiment the communication agent is operable to determine if uploading of the predetermined data is interrupted. The communication agent is operable in cooperation with the communication server to restore uploading of the predetermined data to the network management system from the point of interruption when a communication link between the network management system communication server and the communication agent is restored.

In one embodiment the at least one processor is operable to process the predetermined data prior to the data being uploaded; and the at least one processor is operable to store the processed predetermined data as the predetermined data in the memory.

In one embodiment, a time stamp is generated for the predetermined data when it is acquired. The time stamp identifies the time the predetermined acquired data is acquired. The time stamp is stored in the memory in association with the corresponding processed predetermined data.

In one embodiment, the communication agent is operable to determine when uploading occurs.

In various embodiments, the predetermined data comprises statistical data and/or diagnostic data.

In various embodiments, an interface is disposed between the at least one processor and the vehicle network bus. The predetermined data may comprise diagnostic data obtained via said vehicle interface. The at least one processor is operable to process the diagnostic data to generate message data. The communication agent is operable to upload the message data to the network management system.

The communication agent is operable to upload the message data via one of the local area network interface and the wide area network interface.

In various embodiments, the application is downloaded to the vehicle via one of the wide area network interface and the local area network interface.

In yet further embodiments, a vehicle comprises a vehicle network bus; a local area network interface comprising a first wireless transceiver of a first predetermined type to provide a link to first a local area network; a wide area network interface comprising a second wireless transceiver of a second predetermined type to provide a link to a wide area network; at least one processor to control operation of the local area network interface and the wide area network interface. At least one of the wide area network interface and the local area network interface is selectively operable to establish a wireless communication link with a network management system comprising a communication server. The vehicle further comprises a communication agent; and an application executable by the at least one processor to selectively acquire predetermined data from the vehicle network bus. The communication agent is operable to upload the predetermined data to the network management system.

BRIEF DESCRIPTION OF THE DRAWING

The invention will be better understood by reading the following detailed description in conjunction with the drawing figures in which like designators refer to like elements, and in which.

DETAILED DESCRIPTION

Figure 1:
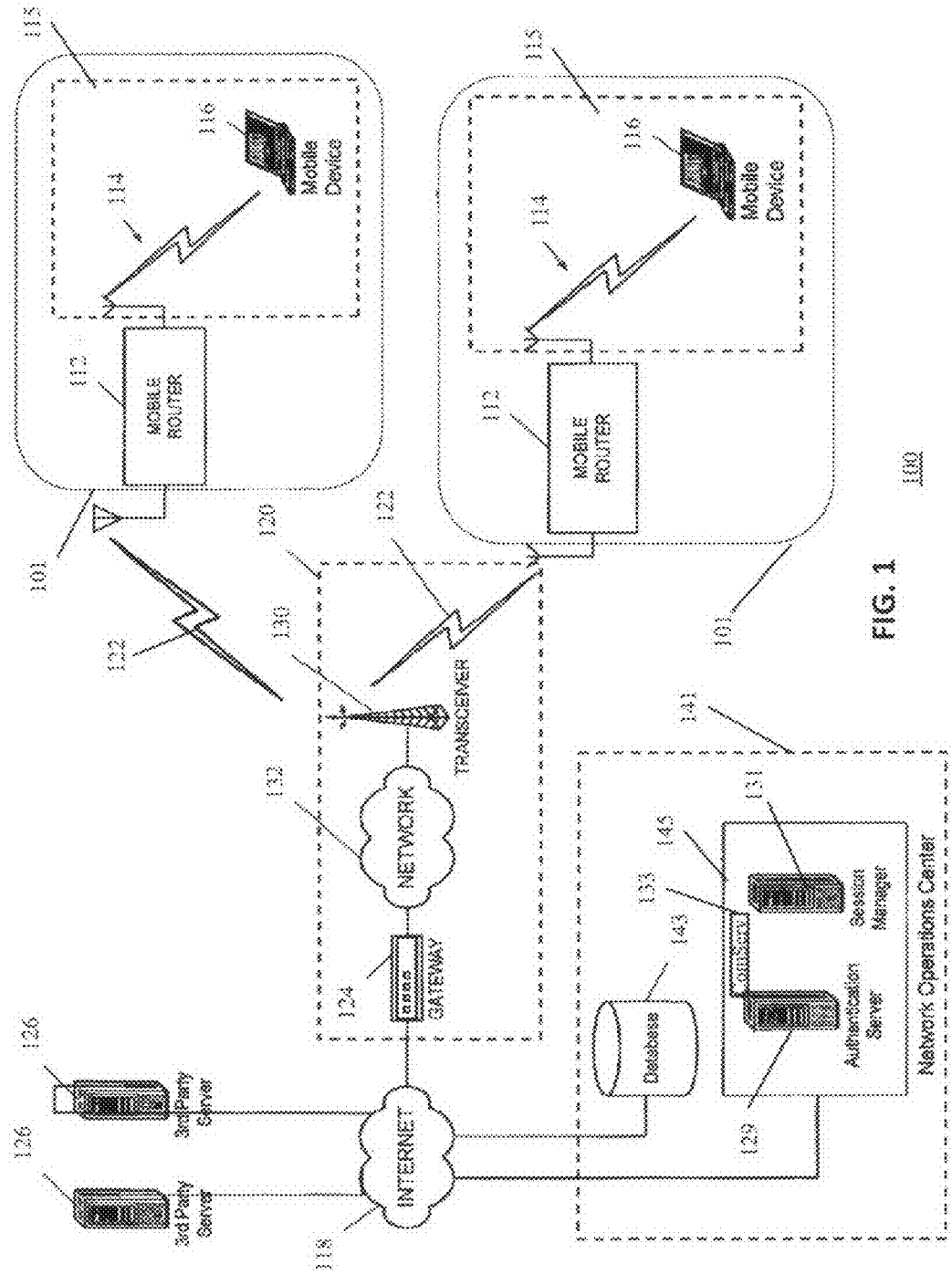
FIG. 1 is a block diagram of a first mobile router network arrangement.

FIG. 1 is a diagram of a mobile router network 100. Mobile router network 100 comprises a plurality of vehicles 101, each having therein a mobile router 112. Each mobile router 112 includes a wireless local area network 115. Each wireless local area network may be in communication with one or more corresponding mobile devices 116 via a wireless communication link 114. Each wireless local area network 115 includes mobile router 112 and may or may not include one or more mobile devices 116. Each wireless local area network 115 may be, for example, a network compliant with industry standard IEEE 802.11 network, i.e., a Wi-Fi network, or a network compliant with industry standard IEEE 802.16, i.e., a WiMAX network, or a Bluetooth network, or any other suitable wireless network.

Each mobile device 116 may be any computer processor based device having a wireless transceiver capable of receiving and transmitting data via the wireless communication link 14. For example, one mobile device 116 may be a laptop (or notebook) computer equipped with a wireless network interface card, a wireless-enabled PDA, a pocket or palmtop computer, a Wi-Fi phone (e.g., a Skype phone or VoIP phone), a Wi-Fi appliance, a Sony PlayStation PSP or some other portable, network-enabled gaming station, a video screen, a digital camera, an audio player, a navigation device, a security camera, an alarm device, a wireless payment or POS device, or an automotive electronic device.

Mobile router 112, as explained further, may act as a gateway between wireless network 115 and a backhaul network 20. Backhaul network 120 in turn may be connected to the Internet 118 or any other network, such as an intranet or another WAN, via a gateway 24.

Mobile router 112 communicates with the backhaul network 120 via a backhaul wireless communication link 122. Backhaul wireless communication link 122 may be provided by a wireless network that is part of the backhaul network 120, such as a cellular wireless network. The cellular wireless network may be of any type.

Examples of such types of cellular network, include but are not limited to the following types: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Each mobile router 112 and its corresponding mobile device 116 are co-located in a vehicle 101 so that mobile router 112 is capable of being mobile and operable to establish connectivity whether mobile or stationary such that each end-user of a mobile device 116 can enjoy wireless connectivity to Internet 118 via mobile router 112 as the vehicle travels through cells or nodes associated with wireless network 122. Vehicle 101 may be any type of vehicle that travels over and/or under land, over and/or under water, or in the air or space. The typical most common type of vehicle 101 that is likely to include a mobile router is a car, truck, or bus.

Each mobile router 112 may be mounted in a corresponding vehicle 101 in a secure and generally tamper-resistant location. For example, the mobile router 112 may be mounted in the trunk of an automobile, and the end-user of the mobile device 116 may be a passenger or driver of the automobile. That way, the end-user could enjoy wireless connectivity as the automobile moves between cells of the wireless network 122.

Although only one mobile device 116 is shown in communication with each mobile router 112 shown in FIG. 1, numerous mobile devices 116 may be in communication with a corresponding mobile router 112 via the corresponding local area network 114.

Cellular network cell site transceiver 130 may be used to provide a cellular link to mobile router 112 and both receive and transmit wireless signals to a mobile router 112 via one of the wireless cellular communication links 122. A cellular communication network 132 of cellular backhaul network 120 may communicate via the worldwide web or Internet 118 or another network via one or more gateways 124. Each communication network 132 may include conventional communication network elements to provide wireless cellular network service for each mobile router 112.

Figure 2:
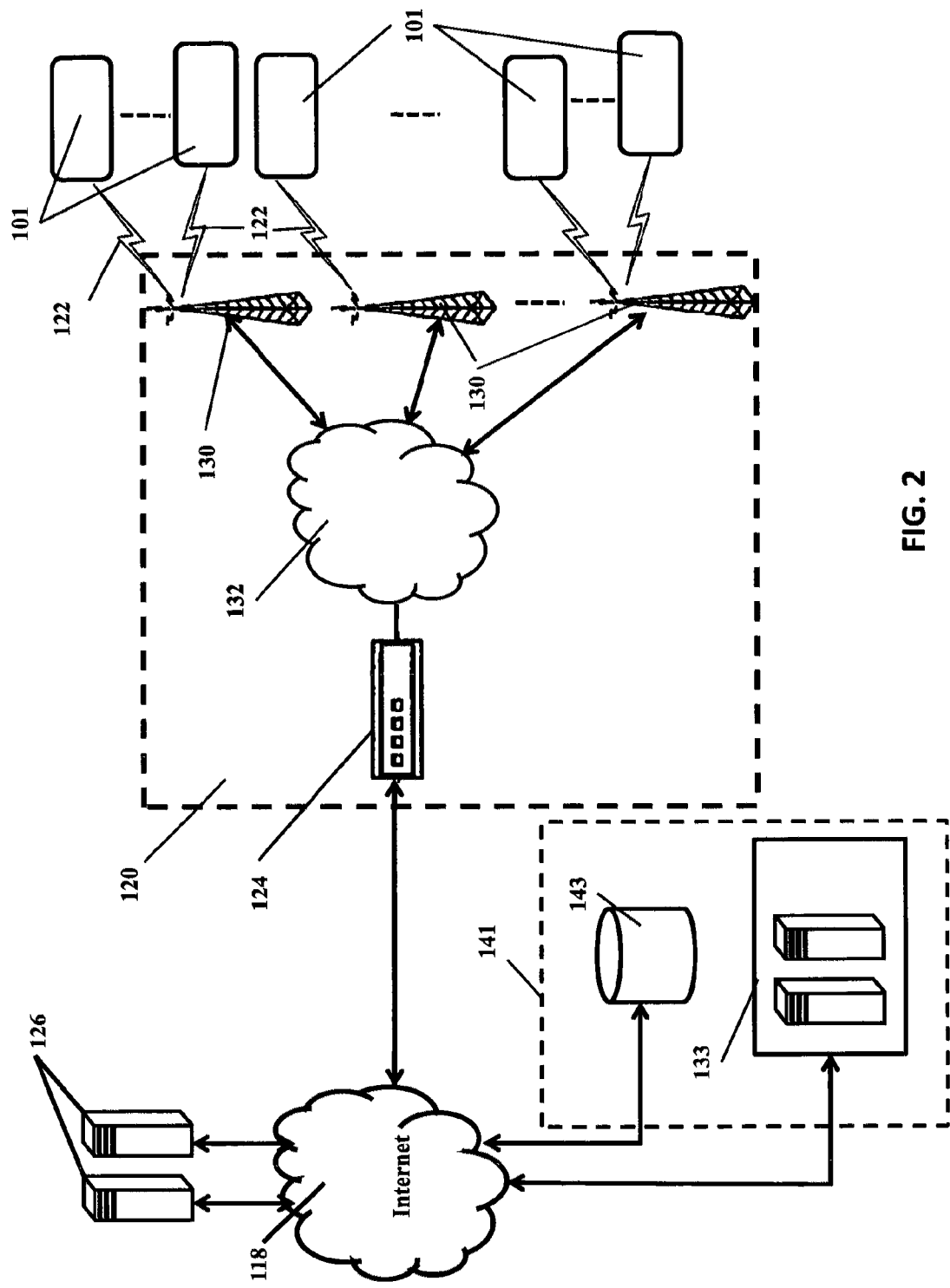
FIG. 2 is a block diagram of an expanded mobile router network arrangement.

Turning now to FIG. 2, mobile router network 100 is shown in a more expanded networked arrangement in which cellular backhaul network 120 is shown as having a plurality of cell site transceivers 130, each of which can communicate with one or more vehicles 101 having a router therein. FIG. 2 shows one gateway 124 to Internet 118, but it will be appreciated that there may be a plurality of such gateways 124, each of which may have access to the Internet 118 or to another network.

Figure 3:
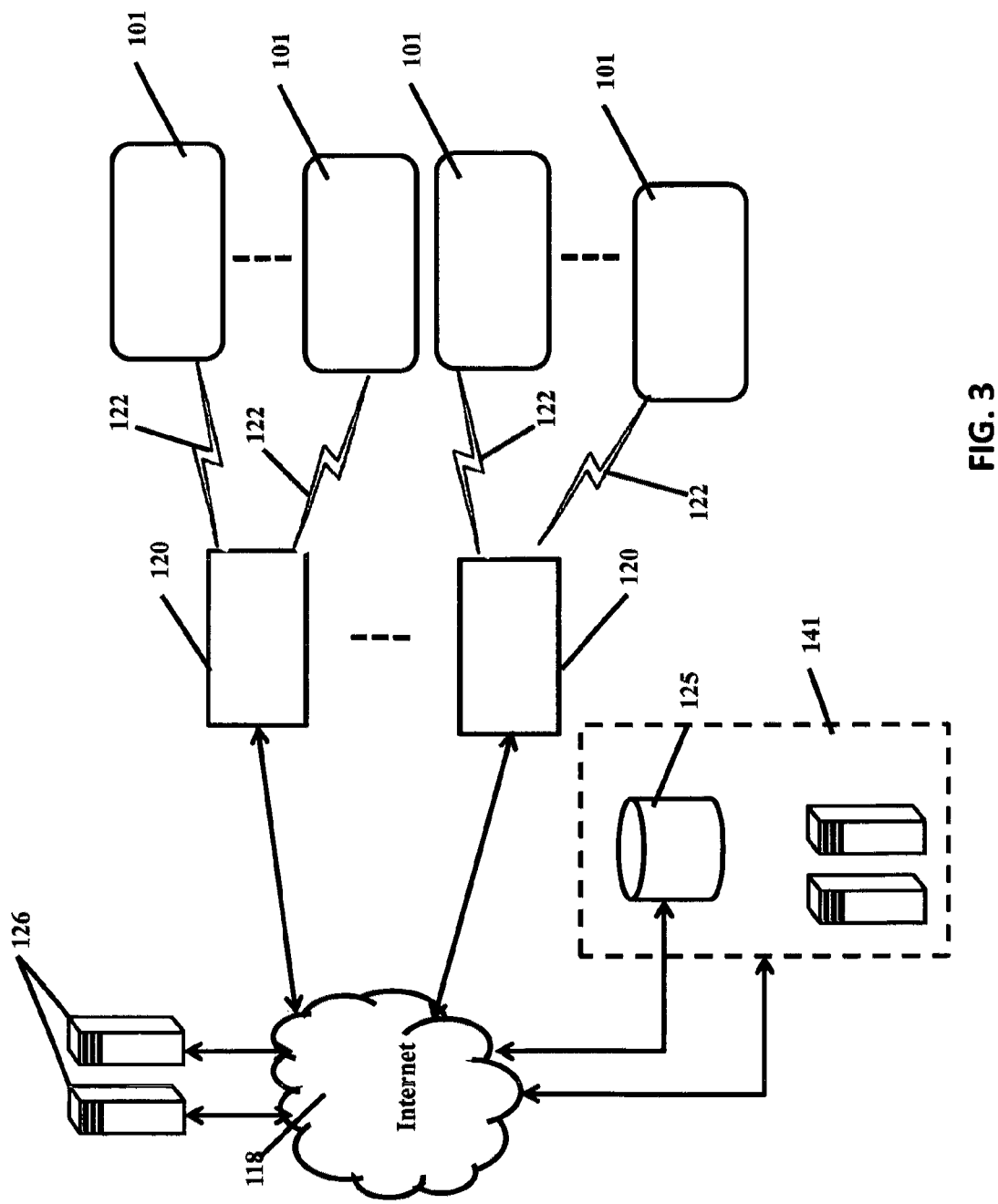
FIG. 3 is a block diagram of a further expanded mobile router network arrangement.

Turning now to FIG. 3, mobile router network 100 is illustrated in further expanded form to show that in which there may be a plurality of cellular backhaul networks 120 may each comprise a number of cell site transceivers, each located in different areas serviced by the backhaul network 120, such that the mobile router 12 may stay in communication with the backhaul network 20 as the mobile router 12 moves between cells or nodes of the backhaul network 20. It will be appreciated by those skilled in the art, that there is virtually no limit to the size of mobile router network 100.

Each of FIGS. 1 through 3 shows that mobile router network 110 comprises at least one network operations center 141. Network operations center 141 comprises a database 143 and a network management system 145. Network management system 145 is a combination of hardware and software used to monitor and administer or otherwise manage mobile router network 100. Each mobile router 120 is managed as an individual network element.

Network management system 145, comprises an authentication server 129, a session manager 131, and a communication server 133. Communication server 133 is a combination of hardware and software used to manage communications between mobile routers 120, and network management system 124.

Figure 4:
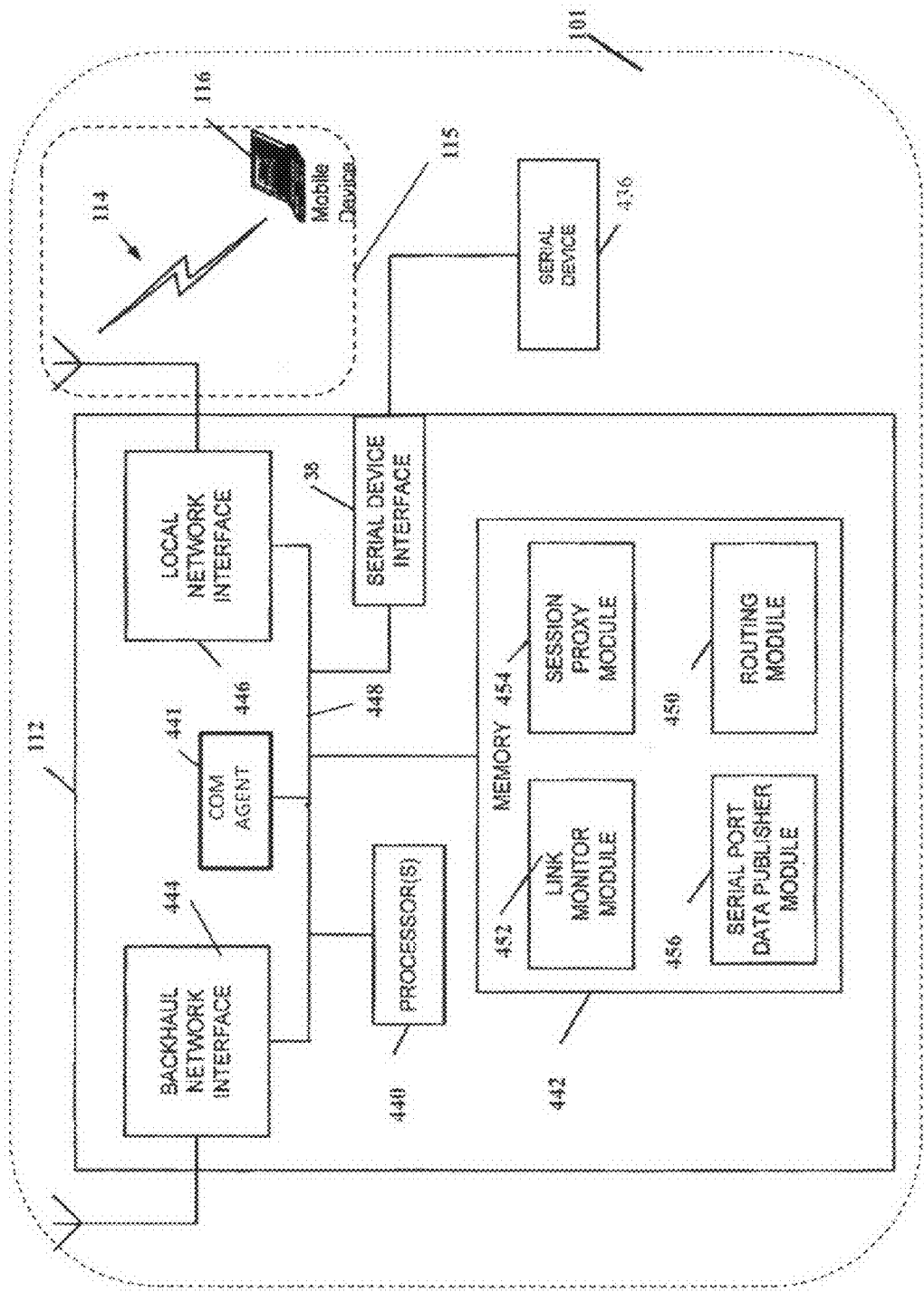
FIG. 4 is a block diagram of a mobile router.
Figure 5:
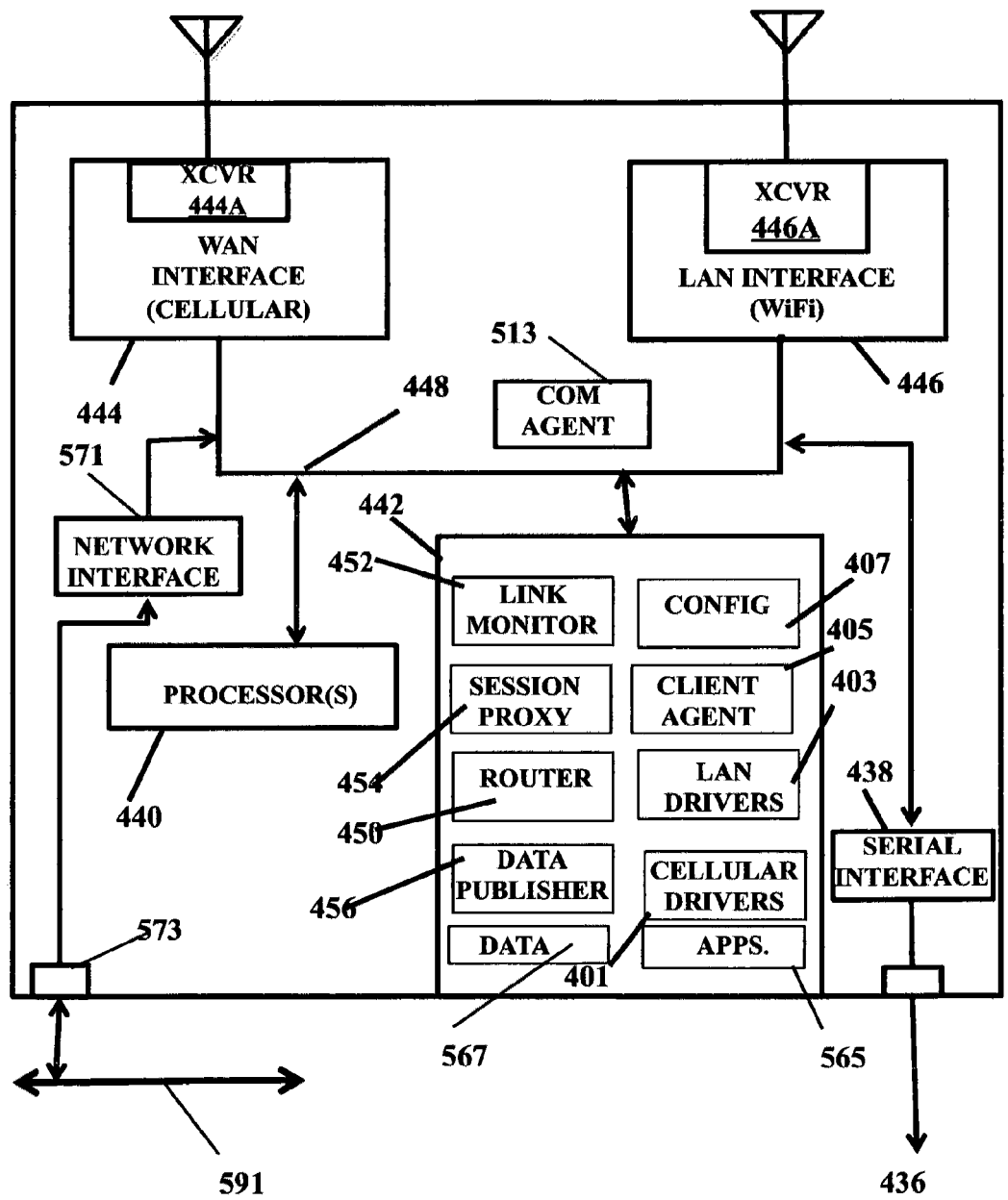
FIG. 5 is a more detailed block diagram of the mobile router of FIG. 4.

FIG. 4 is a simplified block diagram of a mobile router 120. Mobile router 120 may comprise at least one processor 440, one or more memory units 442, a backhaul network interface or wide area network interface or cellular network interface 444, and a local network interface 446. A system bus 448 interconnects the at least one processor 440, memory units 442, backhaul network interface 444 and local network interface 446.

Backhaul or cellular network interface 444 interfaces with and provides a wireless communication link with backhaul or cellular network 120 via cell site transceiver 130. Backhaul or cellular network interface 444 may interface with one or more types of wireless cellular communication links 22. For example, the backhaul cellular network interface 444 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Local network interface 446 interfaces and provides a wireless communication link with wireless local area network 115. Similarly, local network interface 446 may interface to one or more types of wireless network 115 links such as a Wi-Fi, WiMAX, or Bluetooth link.

At least one processor 440 may execute various programs or instruction code stored in memory 442. Memory 442 may comprise one or more types of computer-readable media. As such, memory 442 may comprise one or more memory chips, optical memory devices, magnetic memory devices, or other memory devices.

Various programs or program modules are executable by at least one processor 440. The program modules include a routing module 450, a link monitor module 452, a session proxy module 454, and a serial port data publisher module 456. The program modules 450, 452, 454, 456 may be stored in portions of memory 442 or in one or move separate memories.

Routing module 450 is executed by at least one processor 440 to route data packets between wireless network 415 and backhaul or cellular network 420. Link monitor program 452 monitors cellular communication links 122 (layer 2) and also Internet communication links (layer 3) via backhaul or cellular network 120 by sending test or probing data packets and monitoring for responses thereto. By monitoring the sending and receiving of test packets and responses, at least one processor 440 executing link monitor program 452 detects if either (or both) of cellular communication link or Internet 118 link fails.

When at least one processor 440, executing link monitor module 52, detects a drop-off, the dropped link is automatically reestablished to minimize the interruption in service to the end user.

In many prior art mobile routers, when communications links are lost, the end-user's applications and network sessions are terminated. The end-user has to restart the applications and/or session when the communications links and network connection are reestablished.

When at least one processor 440 detects a failure in one or both of the communications link 122 or Internet 118 link, at least one processor 440 initiates remedial action by attempting to reestablish the link or links. At least one processor 440 may reestablish the link before any applications on the corresponding mobile device 116 have to be restarted. That way, the user does not have to restart the applications or sessions. The user just typically notices that the applications/sessions slowed for a brief period of time while the connection was being reestablished.

Link monitor module 452 as executed on at least one processor 440 provides adaptive programming. If backhaul or cellular network interface 44 receives data packets over backhaul wireless communication link 122, at least one processor 440 sends fewer probing test data packets. Conversely, if backhaul or cellular network interface 444 does not receive data packets, at least one processor 440 sends more probing test data packets. By monitoring data packets received via backhaul or cellular network interface 444, at least one processor 440 determines that the interface is functioning. Accordingly at least one processor 440 sends data test packets less frequently.

At least one processor 440, executing link monitor module 452, monitors backhaul network interface 444 to determine that data packets are received. If one or more processors 440 determines that backhaul wireless communication link 122 is working, then at least one processor 440 sends fewer active probes on the backhaul or cellular network 120.

At least one processor 440, by executing session proxy module 454 acts as a session proxy for all TCP sessions going through mobile router 112. When a mobile device 116 seeks to establish a TCP session with a destination such as a third party server 126 coupled to Internet 118, at least one processor 440 terminates the TCP session coming from mobile device 116 and, instead, establishes a TCP session via backhaul network interface 444 with the destination. Mobile router 112 also maintains a separate TCP session with mobile device 116 via local wireless communication link 114.

All end-user traffic between mobile device 116 and the destination is transparently routed through mobile router 112 during the two separate sessions. If one session such as the backhaul wireless communication link 122 goes down that does not negatively affect the session between the mobile router 112 and mobile device 116. As a result, at least one processor 440 executing session proxy program module 454 maintains a TCP session to mobile device 116. If applications running on mobile device 116 are dependent upon a TCP session, the applications may continue to run because there is a TCP session with the mobile router 112, even though the TCP session over the backhaul or cellular wireless communication link 122 is lost. When communications via backhaul or cellular communication link 122 are reestablished, mobile device 116 is able to keep running its applications and session without having to restart the applications.

When communication over backhaul network or cellular communication link 122 is interrupted, one or more processors 40 executing session proxy program module 454 prevent the TCP session for wireless communication link 114 to mobile device 116 from starting its back-off timers. Under TCP protocol, mobile device 116 would normally assume that it cannot forward packets because of network congestion and it would accordingly start to slow down the session. In contrast, at least one processor 440 executing session proxy module 454 maintains a TCP session between mobile router 112 and mobile device 116. Mobile 116 device does not assume that network congestion is a problem and the TCP session between mobile router 112 and mobile device 116 does not slow down.

Execution of session proxy module 454 by at least one processor 440 may be disabled by mobile device via a control panel for mobile router 112 displayed on mobile device 116. A user can disable execution of session proxy program module 454 when the user wants to maintain a TCP session with the destination.

At least one processor 440 when executing serial port data publisher module 456 makes data received from a serial device 436 connected to a serial port 438 available via mobile router 112 as a TCP stream or as some other type of data stream, such as HS-TCP or SCPS data stream. A remote database 125 may be populated with the data from device 436 via backhaul or cellular network 120 and Internet 118 so that data from serial device 436 can be remotely accessed via the Internet 118.

Serial device 436 may communicate with mobile router 12 using any suitable serial data protocol, including the USB (Universal Serial Bus) standard, the RS-232 standard, the RS-485 standard, or the IEEE 1394 (FireWire) standard, for example.

Serial device 436 may be any suitable type of serial device, such as, for example, a GPS receiver. Other types of serial data devices 436 may be used. Serial device 436 may be a vehicle telematics device that captures data regarding the performance and operation of the vehicle (e.g., diagnostic data) in which the device is installed. Serial device 436 may be a point-of-sale (POS) device that captures sale or payment information.

Serial data device 436 may also be a remote control for an in-car entertainment system that enables downloading music, video, games, etc., to third party systems or a device for interfacing to communication systems.

Rather than transmitting the data to a central server, e.g., database 125, a remote user could access mobile router 112 to access the data from serial device 436 directly. In one embodiment, an authenticated remote user could access an authentication server 123 as shown in FIG. 1 to determine the address of a specific one mobile router 112. The remote user could then use that address to communicate with mobile router 112 directly. Similarly, a local end-user of the mobile router 112 could access the data from the serial device via the local wireless network 114.

At least one processor 440 can output data and command signals via serial interface 438 to serial device 436. Utilizing serial interface 438, at least one processor 440 may activate and control various components and/or systems of a vehicle 101. Serial device 436 may be able to shut of the vehicle engine, unlock the doors, activate alarm functions, etc. Serial device 436 may also, according to various embodiments, perform payment functions, download data, receive advertising, entertainment, gaming, and/or information, as well as perform network management and control.

Each router 112 includes a communication agent 441. Communication agent 441, in the embodiment shown, is a program executed by at least one processor 440, but in other embodiments, communication agent 441 may be a separate processor and program. Communication agent 441 cooperatively operates with communication server 133 shown in FIG. 1.

At least one processor 440 of each mobile router 112 has the ability to run applications that can perform functions and collect data independently of whether or not mobile router 112 is linked to network management system 120.

Each mobile router has associated with it a specific identifier that is maintained in database 145. The specific identifier can be any unique identifier such as a router serial number or a vehicle identification number. Network operations center 141, utilizing communication server 133, is capable of selectively communicating with each mobile router 112.

Advantageously, the selective communication between each mobile router 112 and network operation center 141 permits the downloading of application programs 565 to each of mobile routers 112 for storage in memory 442 on a selective basis, the communication of data obtained from each router 112 as a consequence of execution of a downloaded application program, and/or the communication of statistical information obtained in or by a mobile router as a result of execution of an application program.

In addition, network operation center 141 is operable to facilitate the downloading of application programs 565 ordered by each mobile router 112 directly or indirectly from third party servers 126.

Network operations center 145 also sends predetermined commands to specific predetermined specific mobile routers 112 for immediate execution or for execution at a predetermined specified interval.

Each mobile router 112 is operable to collect data utilizing the application programs 565 it is hosting as well as from interfaces to the vehicle in which mobile router 12 is installed and/or from peripherals 430 coupled to mobile router 112 via serial data interface 438 and/or from mobile device 16. The collected data is marked with a timestamp and stored in memory 442 of mobile router 112. Depending on the nature of the data, mobile router 112 may process the data and prepare the resulting processed data for upload or mobile router 112 may prepare the data immediately for upload to network management system 120. In accordance with one embodiment, the data may be provided by a telematics device or devices.

In certain embodiments, each vehicle 101 includes a vehicle network bus 591 that typically utilizes a standardized protocol over which data or commands may be communicated with various sensors, nodes, processors and other vehicular apparatus coupled to the vehicle network bus.

All modern vehicles include a vehicle network bus 591 that is a specialized internal communications network that interconnects components inside a vehicle (e.g. automobile, bus, train, industrial or agricultural vehicle, ship, or aircraft). Special requirements for vehicle control such as assurance of message delivery, assured non-conflicting messages, assured time of delivery as well as low cost, EMF noise resilience, redundant routing and other characteristics are met with the use of various standardized networking protocols.

Standardized vehicle network bus protocols include Controller Area Network (CAN), Local Interconnect Network (LIN) and others.

Vehicle network bus 591 provides access to the various vehicle electronic control modules in the vehicle. Some of the typical electronic modules on today's vehicles are the Engine Control Unit (ECU), the Transmission Control Unit (TCU), the Anti-lock Braking System (ABS) and body control modules (BCM).

A vehicle electronic control module typically gets its input from sensors (speed, temperature, pressure, etc.) that it uses in its computation. Various actuators are used to enforce the actions determined by the module (turn the cooling fan on, change gear, etc.). The electronic control modules need to exchange data among themselves during the normal operation of the vehicle. For example, the engine needs to tell the transmission what the engine speed is, and the transmission needs to tell other modules when a gear shift occurs. This need to exchange data quickly and reliably led to the development of vehicle network bus 591. Vehicle network bus 591 is the medium of data exchange.

Vehicle network bus 591 is utilized to create a central network in the vehicle 101. Each electronic control modules is 'plugged' into the network and can communicate with any other electronic control module installed on the network via vehicle network bus 591. Each electronic control module controls specific components related to its function and communicates with the other modules as necessary, using a standard protocol, over the vehicle network bus 591.

In addition, vehicle network bus 591 may utilize any one of a number of physical transmission media, including, but not limited to: single wire; twisted pair; and fiber optic.

Each mobile router 112 includes a vehicle network bus interface 571 and a connector 573 that connects to the vehicle network bus 591 of vehicle 101.

In one embodiment, a vehicle 101, comprises a vehicle network bus 591 and a mobile router 112. Mobile router 112 comprises a local area network interface 446 comprising a first wireless transceiver 446A of a first predetermined type to provide a link 114 to first a local area network 114 and a wide area network interface 444 comprising a second wireless transceiver 444A of a second predetermined type to provide a link 122 to a wide area network 122. The embodiment further comprises at least one processor 440 to control operation of the local area network interface 446 and the wide area network interface 444. One of the wide area network interface 444 and the local area network interface 446 is selectively operable to establish a wireless communication link with network management system 141 comprising a communication server 133. Each router 112 further comprises a communication agent 513; and an application 565 executable by the at least one processor 440 to selectively acquire predetermined data from the vehicle network bus 591. Communication agent 513 is operable to upload the predetermined data obtained from vehicle network bus 591 to network management system 141.

At least one processor 40 is operable to acquire the predetermined data Miring time periods that wide area network interface 444 is not communicating with network management system 141. Communication agent 513 is operable to upload the predetermined data to network management system 141 upon occurrence of a predetermined event.

The predetermined event may comprise a predetermined time period that may be the time wide area network interface 444 is in communication with network management system 141 and/or the predetermined event is determined by the predetermined data, such as, for example, data that indicates deployment of an air bag.

Router 112 stores the predetermined data in memory 567.

At least one processor 140 provides a time stamp for the predetermined data at the time the predetermined acquired data is acquired. The time stamp is stored in memory 567 in association with the corresponding predetermined data.

At least one processor 140 is operable to assign a priority for the predetermined data; and is operable to execute a predetermined action to take with the predetermined data.

At least one processor 140 is operable to initiate immediate upload of the predetermined data to network management system 141 of the predetermined data having a predetermined one assigned priority. By way of non-limiting example, data indicating deployment of air bags would be assigned a priority for immediate upload.

At least one processor 40 is operable to control upload of predetermined data having a first predetermined one assigned priority at a first data rate. At least one processor 40 is operable to control upload of second predetermined data having a predetermined second assigned priority at a second predetermined data rate, the second predetermined data rate being slower than the first predetermined data rate.

Communication agent 513 is operable to determine if uploading of the predetermined data is interrupted. Communication agent 513 is operable in cooperation with the communication server 133 to restore uploading of the predetermined data to network management system 141 from the point of interruption when a communication link between the network management system 141 communication server 133 and the communication agent 513 is restored.

At least one processor 140 is operable to process the predetermined data prior to the data being uploaded; and the at least one processor 140 is operable to store the processed predetermined data as the predetermined data in memory 567.

A time stamp is generated for the predetermined data when it is acquired. The time stamp is stored in memory 567 in association with the corresponding processed predetermined data.

Communication agent 513 may be further operable to determine when uploading occurs in cooperation with the application program or programs 565.

The predetermined data may comprise statistical data and/or diagnostic data. The diagnostic data is obtained via the vehicle network bus interface 571. At least one processor 140 is operable to process the diagnostic data to generate message data. Communication agent 513 is operable to upload the message data to network management system 141 via one of the local area network interface 446 and the wide area network interface 444.

In various embodiments, the application or applications 565 is or are downloaded to the vehicle via one of the wide area network interface 444 and the local area network interface 446.

It will be appreciated by those skilled in the art that the various functions of each of the plurality of mobile routers 112 may be integrated directly into a vehicle 101. In such an application of the principles of the invention, a vehicle 101 may comprise a vehicle network bus 591; a local area network interface 546 comprising a first wireless transceiver 546A of a first predetermined type to provide a link 114 to first a local area network 115; a wide area network interface 444 comprising a second wireless transceiver 444A of a second predetermined type to provide a link 122 to a wide area network 120; at least one processor 140 to control operation of the local area network interface 446 and the wide area network interface 444. At least one of the wide area network interface 446 and the local area network interface 444 is selectively operable to establish a wireless communication link with a network management system 141 comprising a communication server 133. Vehicle 101 further comprises a communication agent 441 and one or more applications 565 executable by the at least one processor 140 to selectively acquire predetermined data from the vehicle network bus 591. Communication agent 513 is operable to upload the predetermined data to network management system 141.

Data for uploading can be prioritized and rate limited by at least one processor 140. By way of non-limiting example, if the data has a high priority, such as an indication of airbag deployment then the data is immediately prioritized over anything else and is uploaded. If the data has a low priority it can be sent at a low bit rate so as not to interfere with the experience of the user of mobile device 16 or anything the user might be doing. For example, low priority data may be "trickled up" or uploaded at 10 Kbps.

If the uploading of data from a mobile router 112 or vehicle 101 is interrupted for any reason the session, such as, for example, by loss of communications via a wireless wide area network communication link 122, mobile router 112 or at least one processor 140 will restore the uploading of data where the uploading had left off, when a communication link is again established to communication server 133.

In accordance with an aspect of the embodiment, a method is provided for use with a vehicle 101 comprising a vehicle network bus 591. The method includes the step of providing the vehicle with a local area network interface 446 comprising a first wireless transceiver 446A of a first predetermined type to provide a link 114 to a local area network 115 comprising a first client device 116; providing vehicle 101 with a wide area network interface 444 comprising a second wireless transceiver 444A of a second predetermined type to provide a link to a wide area network 120; providing vehicle 101 with one or more processors 440 to control operation of the local area network interface 446 and the wide area network interface 444; selectively operating one of the wide area network interface 444 and the local area network interface 446 to establish a wireless communication link with a network management system 120 comprising a communication server 133; providing a communication agent 513; providing an application 565 executable by at least one processor 440; executing application 556 by at least one processor 440 to selectively acquire predetermined data from vehicle network bus 591; and operating communication agent 513 to upload the predetermined data to network management system 120.

The method further includes the steps of: operating at least one processor 440 to acquire the predetermined data during time periods that the wide area network interface 444 is not communicating with network management system 120; and uploading the predetermined data to network management system 120 during time periods that wide area network interface 444 is in communication with network management system 120. The method includes providing vehicle 101 with a memory 567; and storing the predetermined data in memory 567. In addition, the method includes: operating one or more processors 440 to provide a time stamp for the predetermined acquired data at the time the predetermined acquired data is acquired; and storing the time stamp in memory 567 in association with the predetermined data.

In one embodiment, the method comprises: operating at least one processor 440 is to assign a priority for the predetermined data; and operating at least one processor 440 to execute a predetermined action to take with the predetermined data based upon the priority.

The method may comprise operating one or more processors 440 to initiate immediate upload to network management system 120 predetermined data having a predetermined one assigned priority.

Still further, the method may include operating at least one processor 440 to control upload of the predetermined data having the predetermined one assigned priority at a first data rate; and operating at least one processor 440 to control uploading of the predetermined data having a predetermined second assigned priority at a second predetermined data rate, the second predetermined data rate being slower than the first predetermined data rate.

The method includes utilizing communication agent 513 to determine if uploading of the predetermined data is interrupted; and operating communication agent 513 in cooperation with the network management system to restore uploading of the predetermined data to network management system 120, from the point of interruption, when a communication link between network management system 120 and communication agent 513 is restored.

In certain embodiments the method includes selecting the predetermined data to comprise statistical data and/or diagnostic data.

The method may include providing a vehicle network interface 571 between at least one processor 440 and vehicle network bus 591; and selecting the predetermined data to comprise diagnostic data obtained via vehicle network bus 591

The method may further comprise operating one or more processors 440 to process diagnostic data to generate message data; utilizing communication agent 513 to upload the message data to network management system 120; and uploading the message data to network management system 120 via one of the local area network interface 446 and the wide area network interface 444.

In various embodiments, the method may include downloading application 565 to vehicle 101 via one of the wide area network interface 444 and the local area network interface 446.

In one embodiment, a user of one mobile device 116 in its corresponding mobile router 112 purchases a specific application such as a "Remote Emissions Test" for the corresponding vehicle 101 and mobile router 112 stores the application in memory 565.

In one embodiment, to execute a remote emissions test application, a execute remote emissions test command is sent to a mobile router 112 in vehicle 101 via communication server 133 as indicated at step 601. Communication agent 513 receives an emissions test command. To execute the command, at least at least one processor 140 determines when vehicle 101 is in an appropriate state for testing, e.g., at idle and motionless.

Mobile router 112 in vehicle 101 collects predetermined types of diagnostics data from vehicle 101 via vehicle network bus 591 coupled to network bus interface 571.

At least one or more processor 140 utilizes the diagnostic data to determine whether vehicle 101 passes or fails the emissions test. Mobile router 112 automatically sends a pass/fail message to network management system 141 via communications server 133.

Network management system 141 can correlate the emissions test results with the corresponding vehicle's vehicle identification number and upload both to network management system 141. Network management system 141, in turn uploads the emissions test results and vehicle identification number to the state regulatory agency.

In one embodiment, a user of one mobile device 116 in its corresponding mobile router 112 purchases a specific application such as a "Remote Emissions Test" for the corresponding vehicle 101 and mobile router 112 stores the application in memory 565.

It will be appreciated by those skilled in the art that various changes and modifications may be made to the embodiments described herein without departing from the spirit or scope of the invention. It is intended that the invention not be limited in any way by the embodiments shown and described herein, but that the invention be limited only by the claims appended hereto.

What is claimed is:

1. A vehicle, comprising:
  a vehicle network bus;
  a mobile router comprising:
    a local area network interface comprising a first wireless transceiver of a first predetermined type to provide a link to a local area network comprising a first client device;
    a wide area network interface comprising a second wireless transceiver of a second predetermined type to provide a link to a wide area network;
    at least one processor to control operation of said local area network interface and said wide area network interface;
    one of said wide area network interface and said local area network interface selectively operable to establish a wireless communication link with a network management system separate from said wide area network and said local area network, said network management system comprising a communication server, said network management system being operable to monitor, administer and manage acquired data from and an operation of each router in a network of mobile routers comprising said mobile router;
    an application executable by said at least one processor to selectively acquire predetermined data from said vehicle network bus;
    a communication agent operable to upload said predetermined data to said network management system communication server;
  said at least one processor is operable to assign a priority selected from a plurality of priorities to said predetermined data;
  said at least one processor is operable to control upload of said predetermined data having a first one priority at a first data rate; and
  said at least one processor is operable to control upload of said predetermined data having a predetermined second priority at a second predetermined data rate, said second predetermined data rate being slower than said first predetermined data rate.

2. A vehicle in accordance with claim 1, comprising:
  said at least one processor is operable to acquire said predetermined data during time periods that said wide area network interface is not communicating with said network management system; and
  said communication agent is operable to upload said predetermined data to said network management system upon occurrence of a predetermined event.

3. A vehicle in accordance with claim 2, wherein:
  said predetermined event comprises a predetermined time period.

4. A vehicle in accordance with claim 3, wherein:
  said predetermined time period is the time that said wide area network interface is in communication with said network management system.

5. A vehicle in accordance with claim 3, wherein:
  said predetermined event is determined by the predetermined data.

6. A vehicle in accordance with claim 1, wherein:
  said router comprises a memory, and
  said predetermined data is stored in said memory.

7. A vehicle in accordance with claim 6, comprising:
  said at least one processor provides a time stamp for said predetermined acquired data at the time said predetermined acquired data is acquired.

8. A vehicle in accordance with claim 7, comprising:
  said time stamp is stored in said memory in association with said predetermined data.

9. A vehicle in accordance with claim 1, comprising:
  said at least one processor is operable to assign a priority for said predetermined data;
  said at least one processor is operable to execute a predetermined action to take with said predetermined data.

10. A vehicle in accordance with claim 9, comprising:
  said at least one processor is operable to initiate immediate upload of said predetermined data having a predetermined one priority of said plurality of priorities to said network management system.

11. A vehicle in accordance with claim 10, comprising:
  said at least one processor is operable to control upload of said predetermined data having said predetermined one priority at a first data rate.

12. A vehicle in accordance with claim 2, comprising:
  said communication agent is operable to determine if uploading of said predetermined data is interrupted.

13. A vehicle in accordance with claim 12, comprising:
  said communication agent is operable in cooperation with said communication server to restore uploading of said predetermined data to said network management system from the point of interruption when a communication link between said network management system communication server and said communication agent is restored.

14. A vehicle in accordance with claim 6, comprising:
  said at least one processor is operable to process said predetermined data prior to said data being uploaded; and
  said at least one processor is operable to store said processed predetermined data as said predetermined data in said memory.

15. A vehicle in accordance with claim 14, comprising:
  a time stamp for said predetermined acquired data, said time stamp identifying time said predetermined acquired data is acquired.

16. A vehicle in accordance with claim 15, comprising:
  said time stamp is stored in said memory in association with the corresponding said processed predetermined data.

17. A vehicle in accordance with claim 2, comprising:
  said communication agent is operable to determine when said uploading occurs.

18. A vehicle in accordance with claim 2, comprising:
  said predetermined data comprises statistical data.

19. A vehicle in accordance with claim 2, wherein:
said predetermined data comprises diagnostic data.

20. A vehicle in accordance with claim 1, comprising:
an interface between said at least one processor and said vehicle network bus.

21. A vehicle in accordance with claim 20, wherein:
said predetermined data comprises diagnostic data obtained via said vehicle interface.

22. A vehicle in accordance with claim 20, comprising:
said at least one processor is operable to process said diagnostic data to generate a message data.

23. A vehicle in accordance with claim 22, comprising:
said communication agent is operable to upload said message data to said network management system.

24. A vehicle in accordance with claim 23, comprising:
said communication agent is operable to upload said message data via one of said local area network interface and said wide area network interface.

25. A vehicle in accordance with claim 1, comprising:
said application is downloaded to said vehicle via one of said wide area network interface and said local area network interface.

26. A vehicle, comprising:
a vehicle network bus;
a local area network interface comprising a first wireless transceiver of a first predetermined type to provide a wireless communications data link to a first a local area network;
a wide area network interface comprising a second wireless transceiver of a second predetermined type to provide a communications data link to a wide area network;
at least one processor to control operation of said local area network interface and said wide area network interface;
one of said wide area network interface and said local area network interface selectively operable to establish a wireless communication link via said wide area network or via said local area network with a network management system for a data network comprising a plurality of vehicles including said vehicle, said network management system comprising a communication server, said network management system being separate from said wide area network and said local area network;
an application executable by said at least one processor to selectively acquire predetermined data from said vehicle network bus;
a communication agent operable in cooperation with said communication server to upload said predetermined data to said network management system;
said at least one processor is operable to assign one priority selected from a plurality of priorities to said predetermined data;
said at least one processor is operable to control upload of said predetermined data having a first one assigned priority at a first data rate;
said at least one processor is operable to control upload of said predetermined data having a predetermined second one assigned priority at a second predetermined data rate, said second predetermined data rate being slower than said first predetermined data rate.

27. A vehicle in accordance with claim 26, comprising:
said at least one processor is operable to acquire said predetermined data during time periods that said wide area network interface is not communicating with said network management system; and
said communication agent is operable to upload said predetermined data to said network management system upon occurrence of a predetermined event.

28. A vehicle in accordance with claim 27, wherein:
said predetermined event comprises a predetermined time period.

29. A vehicle in accordance with claim 28, wherein:
said predetermined time period is the time that said wide area network interface is in communication with said network management system.

30. A vehicle in accordance with claim 28, wherein:
said predetermined event is determined by the predetermined data.

31. A vehicle in accordance with claim 26, comprising:
a memory, and
said predetermined data is stored in said memory.

32. A vehicle in accordance with claim 31, comprising:
said at least one processor provides a time stamp for said predetermined acquired data at the time said predetermined acquired data is acquired.

33. A vehicle in accordance with claim 32, comprising:
said time stamp is stored in said memory in association with said predetermined data.

34. A vehicle in accordance with claim 26, comprising:
said at least one processor is operable to execute a predetermined action to take with said predetermined data.

35. A vehicle in accordance with claim 34, comprising:
said at least one processor is operable to initiate immediate upload of said predetermined data having a predetermined one assigned priority to said network management system.

36. A vehicle in accordance with claim 35, comprising:
said at least one processor is operable to control upload of said predetermined data having said predetermined one assigned priority at a first data rate.

37. A vehicle in accordance with claim 36, comprising:
said at least one processor is operable to control upload of said predetermined data having a predetermined second assigned priority at a second predetermined data rate, said second predetermined data rate being slower than said first predetermined data rate.

38. A vehicle in accordance with claim 27, comprising:
said communication agent is operable to determine if uploading of said predetermined data is interrupted.

39. A vehicle in accordance with claim 38, comprising:
said communication agent is operable in cooperation with said communication server to restore uploading of said predetermined data to said network management system from the point of interruption when a communication link between said network management system communication server and said communication agent is restored.

40. A vehicle in accordance with claim 31, comprising:
said at least one processor is operable to process said predetermined data prior to said data being uploaded; and
said at least one processor is operable to store said processed predetermined data as said predetermined data in said memory.

41. A vehicle in accordance with claim 40, comprising:
a time stamp for said predetermined acquired data, said time stamp identifying time said predetermined acquired data is acquired.

42. A vehicle in accordance with claim 41, comprising:
said time stamp is stored in said memory in association with the corresponding said processed predetermined data.

43. A vehicle in accordance with claim 27, comprising:
said communication agent is operable to determine when said uploading occurs.

44. A vehicle in accordance with claim 27, comprising:
said predetermined data comprises statistical data.

45. A vehicle in accordance with claim 27, wherein:
said predetermined data comprises diagnostic data.

46. A vehicle in accordance with claim 28, comprising:
an interface between said at least one processor and said vehicle network bus.

47. A vehicle in accordance with claim 46, wherein:
said predetermined data comprises diagnostic data obtained via said vehicle interface.

48. A vehicle in accordance with claim 46, comprising:
said at least one processor is operable to process said diagnostic data to generate a message data.

49. A vehicle in accordance with claim 48, comprising:
said communication agent is operable to upload said message data to said network management system.

50. A vehicle in accordance with claim 49, comprising:
said communication agent is operable to upload said message data via one of said local area network interface and said wide area network interface.

51. A vehicle in accordance with claim 26, comprising:
said application is downloaded to said vehicle via one of said wide area network interface and said local area network interface.

* * * * *